(12) United States Patent
Nielsen

(10) Patent No.: US 6,758,091 B1
(45) Date of Patent: Jul. 6, 2004

(54) METHOD AND AN APPARATUS FOR MEASURING ICING

(75) Inventor: Evan Nielsen, Farsø (DK)

(73) Assignee: Dalsgaard Nielsen ApS, Farsø (DK)

( * ) Notice: Subject to any disclaimer, the term of this patent is extended or adjusted under 35 U.S.C. 154(b) by 0 days.

(21) Appl. No.: 09/914,327

(22) PCT Filed: Mar. 7, 2000

(86) PCT No.: PCT/DK00/00094
§ 371 (c)(1),
(2), (4) Date: Oct. 30, 2001

(87) PCT Pub. No.: WO00/54078
PCT Pub. Date: Sep. 14, 2000

(30) Foreign Application Priority Data

Mar. 8, 1999 (DK) .......................................... 1999 00323

(51) Int. Cl.[7] .............................................. G01W 1/00
(52) U.S. Cl. ................................ 73/170.26; 73/170.16; 73/170.18; 244/117; 244/134; 343/704
(58) Field of Search ......................... 73/170.16–170.26; 244/117, 134; 343/704; 324/351

(56) References Cited

U.S. PATENT DOCUMENTS

| | | | |
|---|---|---|---|
| 3,940,622 A | | 2/1976 | Stallbrass et al. |
| 4,210,021 A | | 7/1980 | Vykhodetsev et al. |
| 4,697,254 A | * | 9/1987 | Pridham ....................... 367/92 |
| 4,730,485 A | | 3/1988 | Franklin et al. |
| 5,003,295 A | | 3/1991 | Kleven |
| 5,317,915 A | | 6/1994 | Choisnet |
| 5,744,711 A | * | 4/1998 | Rasmussen et al. ...... 73/170.21 |
| 6,038,920 A | * | 3/2000 | Gilbert et al. ........... 73/170.23 |
| 6,044,699 A | * | 4/2000 | Greenblatt et al. ....... 73/170.17 |
| 6,377,207 B1 | * | 4/2002 | Solheim et al. ............. 342/351 |

FOREIGN PATENT DOCUMENTS

NO 151060 10/1984

* cited by examiner

Primary Examiner—Edward Lefkowitz
Assistant Examiner—Alandra Ellington
(74) Attorney, Agent, or Firm—Dykema Gossett PLLC

(57) ABSTRACT

An apparatus and a method for local measurement of an icing factor for atmospheric air containing supercooled water, and wherein the apparatus comprises at least one surface element made of a material suitable for ice in atmospheric air to freeze on, and said surface element having a predetermined surface area, and wherein the apparats further comprises means that are configured for moving the surface element through the atmospheric air at a predetermined rate and for a predetermined period of time, and wherein means am also provided that are configured for measuring the thickness or mass of the ice frozen fast onto the surface element after the predetermined time interval during which the element is moved through the atmospheric air.

23 Claims, 8 Drawing Sheets

METHOD AND AN APPARATUS FOR MEASURING ICING

BACKGROUND OF THE INVENTION

1. Field of the Invention

The present invention relates to a method and an apparatus for local measurement of an icing factor for atmospheric air containing supercooled water.

2. The Prior Art

Measurements of icing factor are used In particular, but not exclusively, within the fields of aviation and navigation, wherein icing can be a substantial safety hazard and can be the cause of crashes.

The problem arises as a result of atmospheric precipitation, such as rain and mist, that has in its supercooled state a known propensity to freeze on to objects, such as hull and machine parts on vessels as well as aeroplanes.

Thus, in practice critical weather conditions have often necessitated manual observations with a view to forming an impression of the acute risk of icing in order to enable warning of aeroplanes and vessels, if necessary.

It is a problem in this context that such manual observation is based on a subjective discretion, and that consequently a standardised value for the risk of icing is not accomplished. Thus, a warning based on such subjective discretion will be associated with a good deal of insecurity, and the person who receives the warning cannot readily form a reliable picture of the risk of icing, except by relying on the recommendation of the issued warning.

Accordingly, U.S. Pat. No. 4,730,485 and published NO patent application Ser. No. 151,060 teach apparatuses configured for carrying out a more standardised measurement of the amount of atmospheric precipitation.

Thus, U.S. Pat. No. 4,730,485 teaches a stationary measurement device configured for measuring wind velocity as well as wind direction, but it is also suitable for measurement of the current icing.

Published NO patent application Ser. No. 151,060 discloses a stationary weighing apparatus for weighing an amount of atmospheric precipitation in the form of snow or ice that settles on a substantially horizontal weighing plate.

However, it is a problem in connection with these prior art devices that icing often occurs in situations when the air is relatively still, and that the icing factor measured by such devices are erroneous since only small amounts of ice are deposited on the devices.

It is a further problem in connection with the prior art device known from published NO patent application Ser. No. 151,060 that atmospheric precipitation other than supercooled water may deposit on the weighing plate and thus an erroneous weighing results in relation to the icing factor.

U.S. Pat. No. 3,940,622 discloses a detector for detecting the rate of ice-formation. In order to provide an in-stream of air, ambient air flow is created by inducing a primary gas into a duct, the primary gas being supplied, for example, by the engine compressor of a VTOL aircraft.

U.S. Pat. No. 5,317,915 is concerned with the problem of detecting icing-up of a rotor of an aircraft. This known measuring device comprises means for determining an axial load on the rotor axis under dynamic circumstances, i.e. during operation of the rotor.

It is therefore the object of the present invention to provide a method and an apparatus whereby it is possible in almost all weather conditions, in particular also light winds and still air, to provide a standardized measurement result or a standardized value for the icing factor.

SUMMARY OF THE INVENTION

The method according to the present invention thus comprises the following process steps, wherein at least one surface element is provided that is made of a material suitable for ice in atmospheric air to freeze on, said element having a predetermined surface area, wherein the surface element(s) is/are brought to a temperature that corresponds essentially to the temperature of the atmospheric air, wherein a relative movement at a predetermined velocity is subsequently created between the atmospheric air and the surface element(s) by allowing the surface element(s) to move through the atmospheric air, and or a predetermined period of time, and wherein the thickness or mass of the ice frozen fast to the surface element(s) is subsequently measured by means of a measurement device configured therefore after said predetermined period of time.

This means, on the one hand, that atmospheric precipitation other than supercooled raindrops or mist can only with difficulty settle on the surface elements and adversely influence the measurement results, and that it is hereby possible to perform relatively accurate measurements of the icing factor, also in relatively still air.

In case the factor measured is the thickness of the ice layer, it is advantageous—to obtain a representative value therefore—to measure in a number of points, preferably in one or more points on each surface element, the measurement results subsequently being summarised to a single value.

The value thus measured for the thickness of ice layer or weight increase will be a standardised factor that indicates a relative risk of icing of eg aeroplanes or vessels in the area in which measurement is performed. It goes without saying that the value can only be indicative of the risk since, obviously, it will vary more or less compared to the place where the measurement was performed.

The method can advantageously be exercised by use of an apparatus including at least one surface element made of a material suitable for ice in atmospheric air to freeze theron, the surface element(s) having a predetermined surface area, and wherein the apparatus further includes means for moving the surface element(s) through the atmospheric air at a predetermined velocity and for a predetermined period of time; and wherein means are provided for measuring the thickness or the mass of the ice frozen fast onto the surface element(s) after the predetermined period of time during which the surface element(s) have been moved through the atmospheric air.

According to a preferred embodiment of the method, it is ensured that frozen-on ice, if any, is removed prior to a first measurement, and likewise the frozen-on ice is removed from the individual surface element following measurement of its mass or thickness, whereupon a renewed measurement process can be performed. Advantageously, such removal of the ice can be accomplished by heating of the individual surface elements either from the outside or from the inside.

Further advantageously, uniform measurement results are accomplished if a cover is provided that extends at least across the surface element, and covers and shields the surface element, and said cover being removed from the surface element at least for the predetermined period of time during which the surface element is moved through the atmospheric air at a predetermined velocity.

The accuracy of measurement is further enhanced if the surface element is moved through the atmospheric air at a velocity that ensures that atmospheric precipitation that does not freeze on to the surface element is to a substantial extent thrown off the surface element.

In order to ensure that the inside of the cover is protected against atmospheric precipitation settling thereon, it can advantageously be so arranged in its second position that its inside is protected against atmospheric precipitation. It is hereby ensured that atmospheric precipitation cannot drip from the inside of the cover and onto the surface elements when the cover is conveyed across same.

In order to ensure that the surface elements are essentially free of other atmospheric precipitation prior to the amount thereof being determined, they can advantageously be rotated for a predetermined period of time following return of the cover to its first position.

According to a particularly simple method, at least two surface elements are used that are rotatably arranged on a rotor shaft whereby the movement of the two surface elements is effected by a rotation thereof about the rotor shaft.

According to a particularly simple embodiment, the apparatus comprises a weighing device configured for weighing and recording at least the weight of the surface element prior to and after movement of the surface element through the atmospheric air.

According to a particularly simple embodiment the apparatus comprises a rotor with a rotor shaft, and at least two surface elements that extend from the rotor shaft and protrude there from, and wherein means are configured for rotating the rotor about its axis. Hereby it is obtained that the movement mechanisms that bring about the movement of the surface elements through the air can be accomplished in a very simple manner that does not require maintenance.

Besides, with a view to also obtaining an increased accuracy of measurement the apparatus can also comprise a cover that is configured for assuming a first position in which it extends across the surface element, and thereby covers this upwardly, and a second position in which the cover has been removed from the surface element and does not cover same, and this cover is preferably configured such that in its first position, it forms a closed space around the surface element.

In order to be able to perform measurements in quick succession, means are conveniently provided that are, on the one hand, able to heat the surface elements in order to melt the ice deposited thereon, and on the other, to cool them to approximately ambient temperature. This can be obtained in that the surface elements are configured with passageways; and that the apparatus comprises means whereby air can be conveyed through the passageways either in the form of heated air or air with approximately ambient temperature. Heating and cooling of the surface elements can also be accomplished by the closed space underneath the cover being heated and cooled.

It is desirable that the ice formation on the surface elements is as comprehensive as possible to ensure accuracy and speed of measurement, and consequently the surface element will, in a first preferred embodiment, be in the form of a plate with a front and a back which have opposite orientations relative thereto; and wherein the plate is configured in such a manner that the front of the plate faces in the direction in which the surface element is moved through the atmospheric air; and wherein—through said plate—a plurality of passageways are provided from the front of the plate to the rear of the plate, whereby atmospheric air is able to flow through the passageways from the front of the plate to the back of the plate.

According to an alternative, preferred embodiment the apparatus comprises a system of surface elements mounted on a rotatable shaft configured for being arranged in a substantially vertical position. The individual surface elements are configured and arranged such that the individual surface elements will, in correspondence with their projection on a face perpendicular to the rotatable axis, abut on or overlap other surface elements, which means that there is no space between the individual surface elements when the apparatus is viewed from above. Hereby it is obtained that all atmospheric precipitation within the expanse of the apparatus hits the surface elements and thus can be deposited in the form of ice. The larger the overlap between the individual surface elements, the larger the deviation from vertically falling precipitation can be tolerated while ensuring this.

In correspondence with the above teachings, the surface elements can advantageously be configured and arranged such that the individual surface elements corresponding to their projection on a face parallel with the rotatable axis abuts on or overlaps other surface elements, so as to accomplish that there is no space between the individual surface elements when the apparatus is viewed from the side. Hereby it is obtained that the atmospheric air conveyed across the surface elements by the relative movement between the atmospheric air and the surface elements hits a surface element and is thereby able to deposit the water contained therein in the form of ice.

In case of embodiments like the ones described above, it is ensured that the apparatus can be configured with the smallest possible physical dimensions.

The apparatus according to the present invention is particularly suitable for use in airports where the apparatus is preferably arranged at ground level and whereby the apparatus includes means for recording the measured results of the thickness or mass of the ice deposited on the surface elements, and means for visually or auditively emitting a signal regarding the measurement results to the monitoring personnel of the airport.

BRIEF DESCRIPTION OF THE DRAWINGS

The invention will now be described in further detail with reference to the drawings, wherein.

DETAILED DESCRIPTION OF THE PREFERRED EMBODIMENTS

Figure 1:
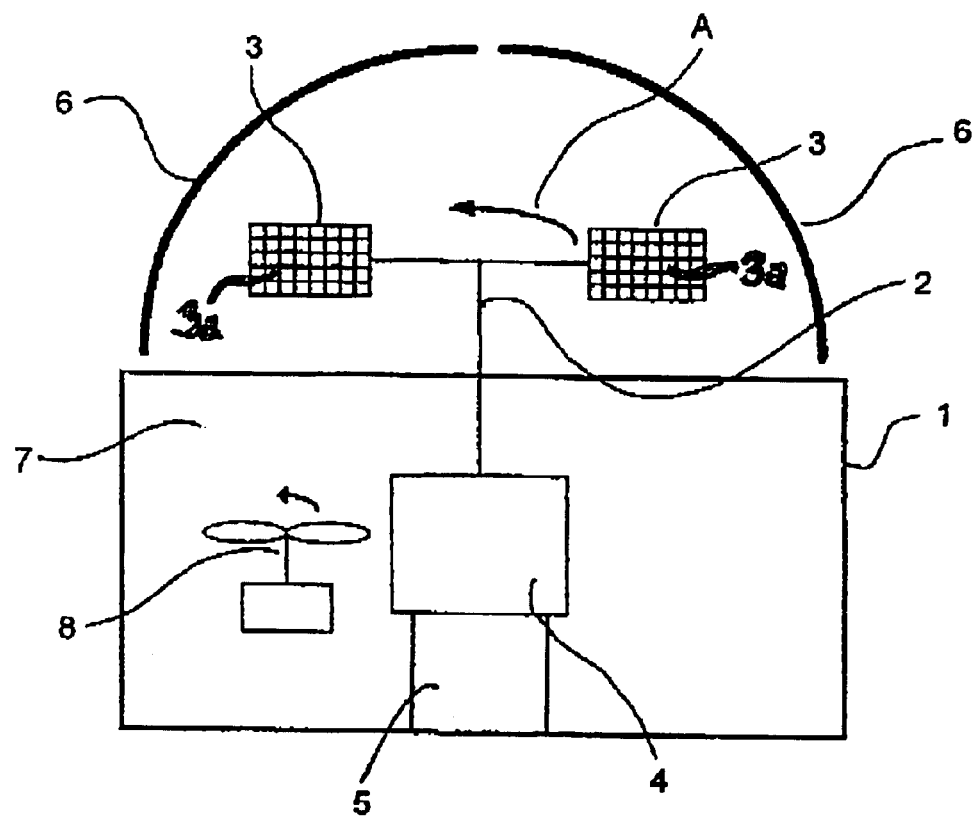
FIGS. 1 through 4 are explanatory sketches using a schematically represented apparatus to illustrate various process steps according to the present invention.

FIG. 1 shows the constructive principles of an apparatus according to the invention, the apparatus including a housing or a frame 1 in which a shaft or a rotor 2 is arranged that supports two diametrically opposed surface elements 3 having predetermined surface areas 3a, the rotor and elements being rotated by a drive unit 4 in the direction of the arrow A. The rotor with one or more surface elements is also referred to as the rotor element.

Corresponding the normal operative state of the apparatus, the shaft or the rotor is configured for being arranged in a substantially vertical position. When, in the following, the terms vertical and horizontal are used, they refer to the apparatus when arranged in such preferred position.

Additionally the apparatus comprises a weighing device 5 configured for weighing the surface elements 3, the rotor 2 and the drive unit 4, whereby a weight increase can be determined.

Besides, the apparatus comprises a movable cover, in FIGS. 1 through 4 shown as a dome-shaped shield consisting of two spherical quarter shells 6 that are shown in FIG. 1 in a first position in which they shield the surface elements 3 and the rotor 2 and form a substantially closed space 7 around the surface elements and the rotor.

Moreover, the apparatus comprises a blower 8 configured for conveying atmospheric air towards the surface elements 3.

In the process step shown in FIG. 1, the rotor is thus rotated in the closed space 7, and as a consequence of the blower 8 generating circulation of air in that space, the surface elements 3 are caused to assume a temperature that corresponds essentially to the ambient temperature.

Figure 2:
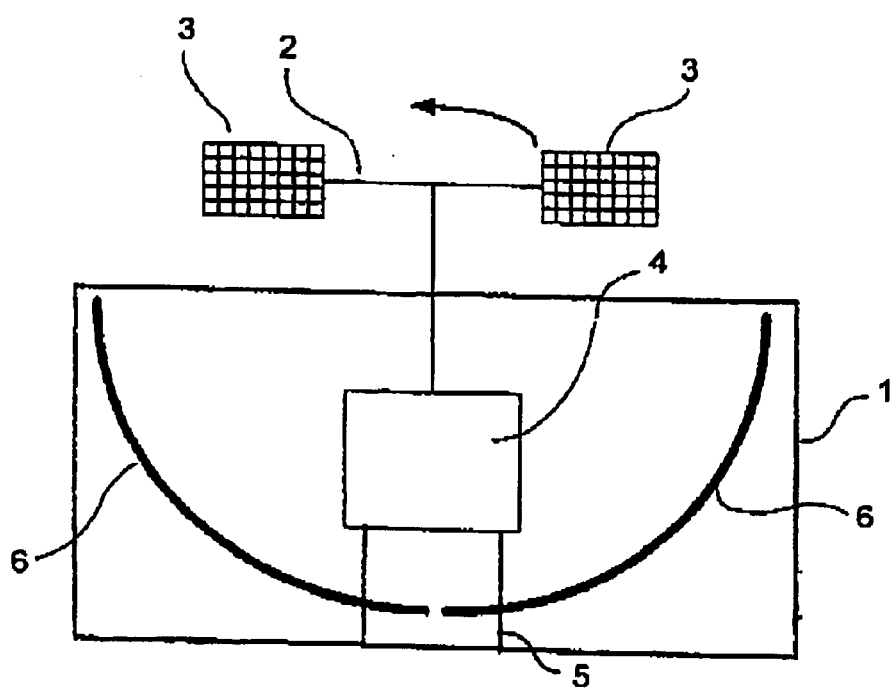

Now, FIG. 2 illustrates a subsequent process step in which the two spherical quarter shells 6 have been withdrawn to a second position in which the surface elements 3 on the rotor 2 rotate in the open air, and wherein—provided supercooled water is present in the air—ice formations will settle on the surface elements 3. It will appear from the figure that the cover in its second position is situated within the housing that is advantageously configured such that inside of the cover is protected against atmospheric precipitation settling thereon. In the embodiment shown, this could only be accomplished by the spherical shells of the cover being conveyed down into the housing through a narrow opening between the top face and lateral walls of the housing. Such configuration ensures that atmospheric precipitation cannot drip from the inside of the cover and down onto the surface elements when the cover is conveyed above them.

In accordance with the invention, the process step shown in FIG. 2 is carried out for a predefined period of time, whereby a suitable amount of ice will deposit on the surface elements, and the rotor is rotated at a velocity that, on the one hand, takes into account that the, ice is not to be thrown off the rotor, but wherein other precipitation, if any, in the form of rain and snow is thrown off to a suitable extent. As shown in the figure, it is of course to be ensured that the cover can be conveyed past the various structures of the housing.

Advantageously, the weighing device can be configured with three weighing cells situated triangularly between the drive unit 4 and the lower part of the housing.

Hereby a stable determination of weight for the drive unit, the rotor, the surface elements and the ice frozen thereon is obtained.

Figure 3:
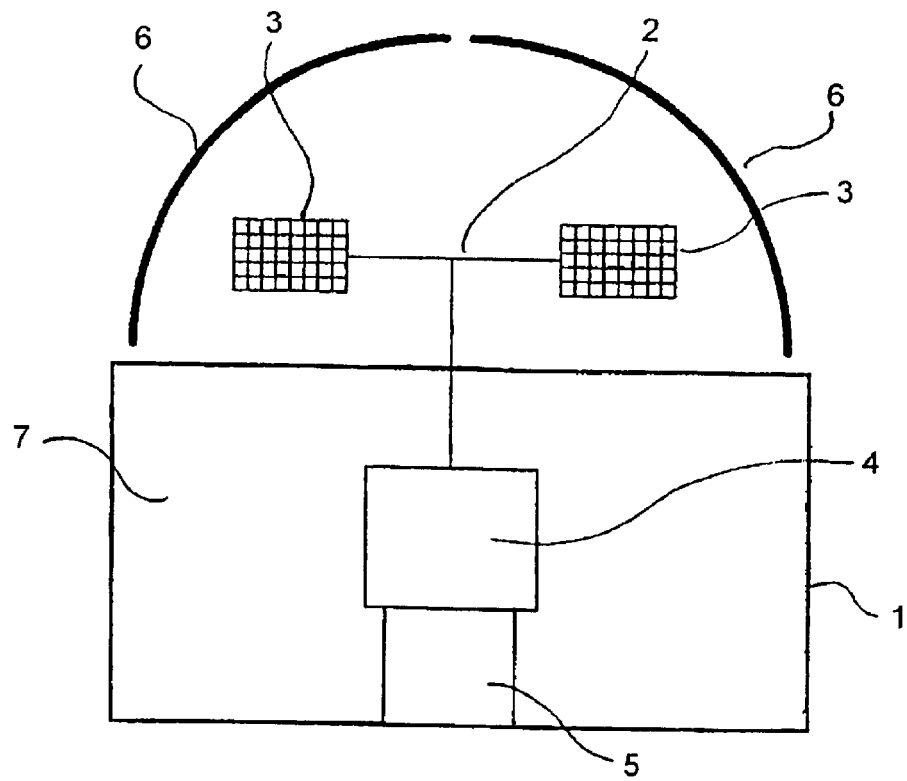

Following the process step shown in FIG. 2, a subsequent step is shown in FIG. 3 wherein the cover has been returned to its first position. In order to ensure that the surface elements are substantially free of atmospheric precipitation other than ice before the amount thereof is determined, they can advantageously be rotated for a predetermined period of time after the cover has reverted to its first position.

Now the surface elements are brought to a halt, and the weight increase of the surface elements resulting from the ice deposited on its surfaces is recorded by means of the weighing device 5, and on the basis of the value measured, a signal can be generated for showing an icing factor; however, the drawing does not feature equipment for this use since it will be obvious to the person skilled in the art to configure such equipment on the basis of the present description.

Figure 4:
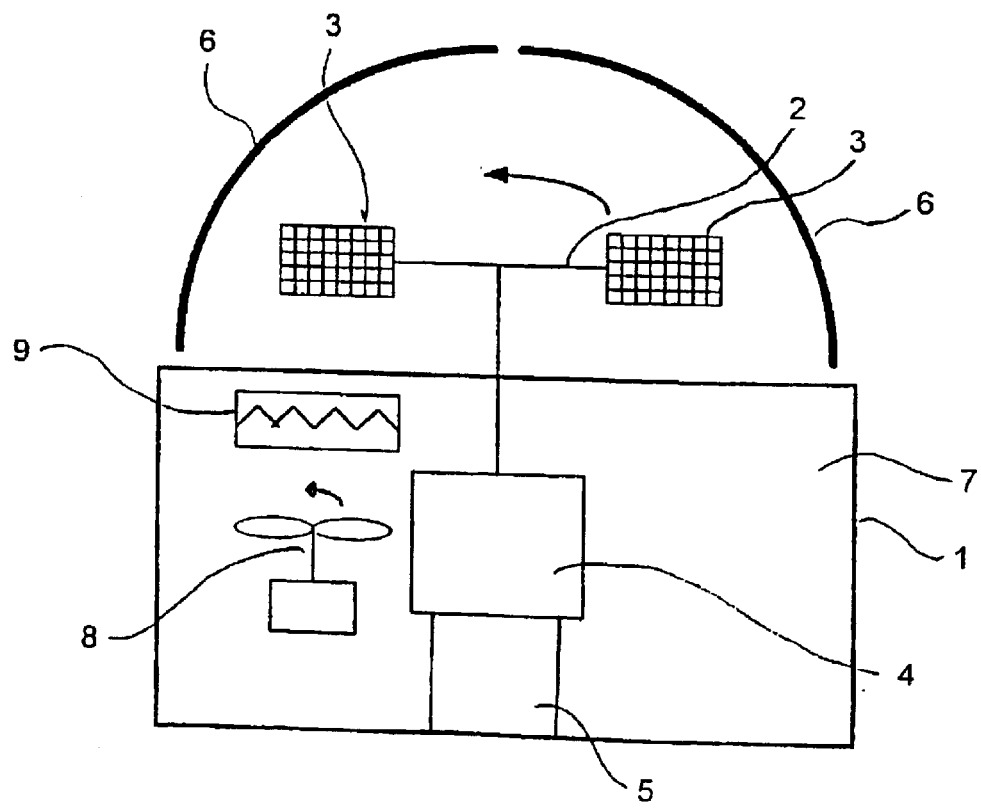

Now a subsequent process step is shown in FIG. 4 wherein the two spherical quarter shells 6 have been moved across the surface elements 3 and shield them so as to form yet again the closed space 7. In this process step the rotor is caused to rotate, and a quick heating of the closed space 7 is carried out by means of the blower 8 and a heater element 9 whereby the ice deposited on the surface elements is melted and thrown off by the rotation of the rotor, whereby the combined weight of the rotor 2 and the surface elements 3 is caused to revert to the initial weight.

Now the process step shown in FIG. 1 can proceed, and the apparatus according to the invention is thus very suitable for carrying out repeated measurements with a very high degree of accuracy in standardised conditions.

Figure 5:
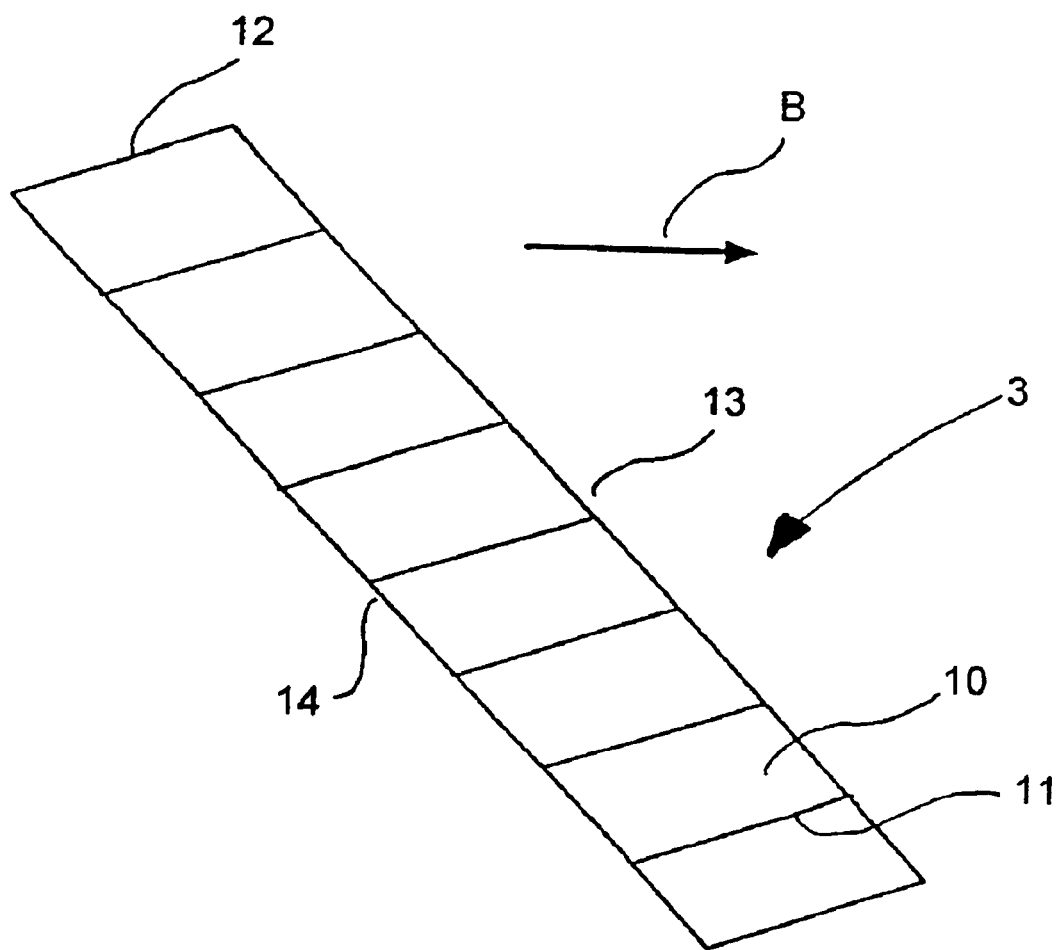
FIG. 5 is a sectional view that illustrates a vertical, sectional view through a surface element for use in the apparatus according to the present invention.

In order to obtain the highest possible accuracy of measurement, the surface elements 3 should be configured with the largest possible surface for adhesion of ice. FIG. 5 illustrates an embodiment wherein a surface element is constructed as a grid, as seen in a vertically sectional view through this, and from which it will appear that the surface element that is moved in the direction of the arrow B has a front 13 and a back 14; and wherein walls 11,12 combine to form passageways 10 that extend from the front 13 to the back 14.

Hereby the surface element forms a relatively large surface compared to the indigenous weight of the surface element which means that a relatively quick formation of a suitable and measurable amount of ice is accomplished on the surfaces of the surface element 3, and such that the surface element can quickly be caused to assume the desired temperatures by the heating as shown in FIG. 4 and the cooling as shown in FIG. 1.

Both walls 11,12 having a downwardly tapering course means that, on the one hand, atmospheric precipitation other than supercooled water or mist is very like to slide or flow off the surface element 3, but also that supercooled water droplets or mist are very like to settle on the surfaces of the surface element without having to pass all the way through the surface element.

The surface elements shown in FIGS. 1 through 4 are, for the sake of clarity, shown to be very small, but according to a preferred embodiment they are dimensioned to essentially fill the space 7, which means that the surface elements as shown in FIGS. 1 through 4 join to constitute an approximate semicircle. Hereby it is ensured that the apparatus can be configured with the smallest possible outer dimensions.

As described above, it should be ensured that the inside of the cover is protected against atmospheric precipitation in all process steps; and this is to ensure accurate determination of the amount of ice frozen fast there on.

Figure 6:
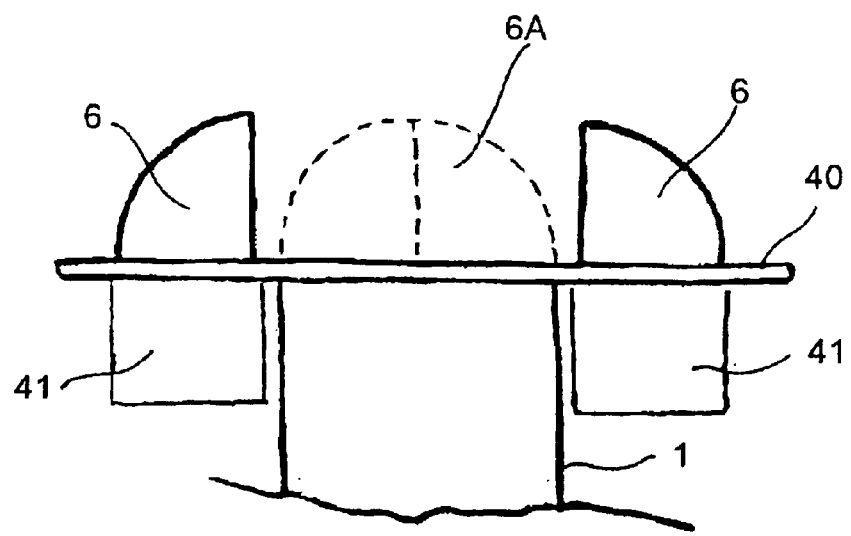
FIGS. 6 through 8 show a first, preferred embodiment of an apparatus according to the invention, wherein the cover is shown in different positions.
Figure 7:
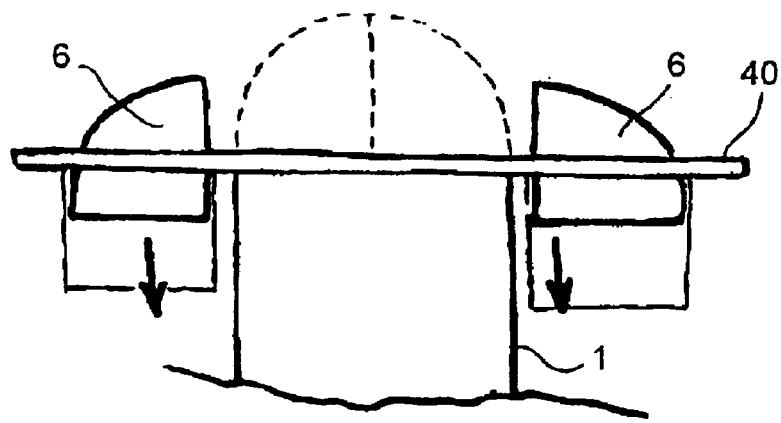
Figure 8:
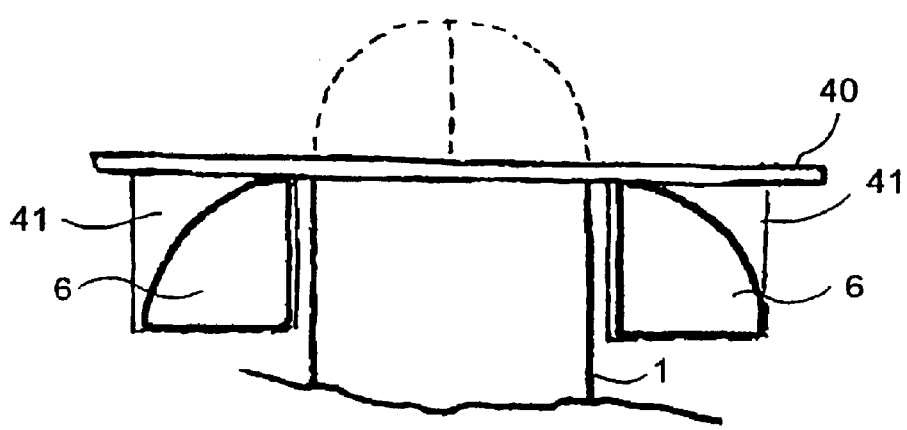

FIGS. 6 through 8 show an embodiment in which an apparatus comprises a housing 1, a cover in the form of two spherical quarter shells 6, two storage units 41 for the two spherical quarter shells and a platform 40 on which the storage units have been arranged. Furthermore the apparatus comprises a rotor element, a drive unit and a (not shown) weighing device as described above.

In a first position the cover 6A covers the rotor element and forms a substantially closed space; in FIG. 6 this is outlined with dotted lines. When it is desired to perform a measurement, the elements of the cover are, as shown in FIGS. 6, 7 and 8, moved to their second position where they are stored for protection in the storage units 41. Since it is in particular the inside of the cover that is to be protected against atmospheric precipitation, it can be chosen to allow the storage units to be upwardly open, which would simplify the construction. Once the first part of the measurement is accomplished the cover reverts to its first position.

Above it has be outlined schematically how protection of the cover inside against the weather can be accomplished, but of course it is possible to select the configuration, shape and the mutual relations of the cover and the storage units on the basis of many considerations.

Figure 9:
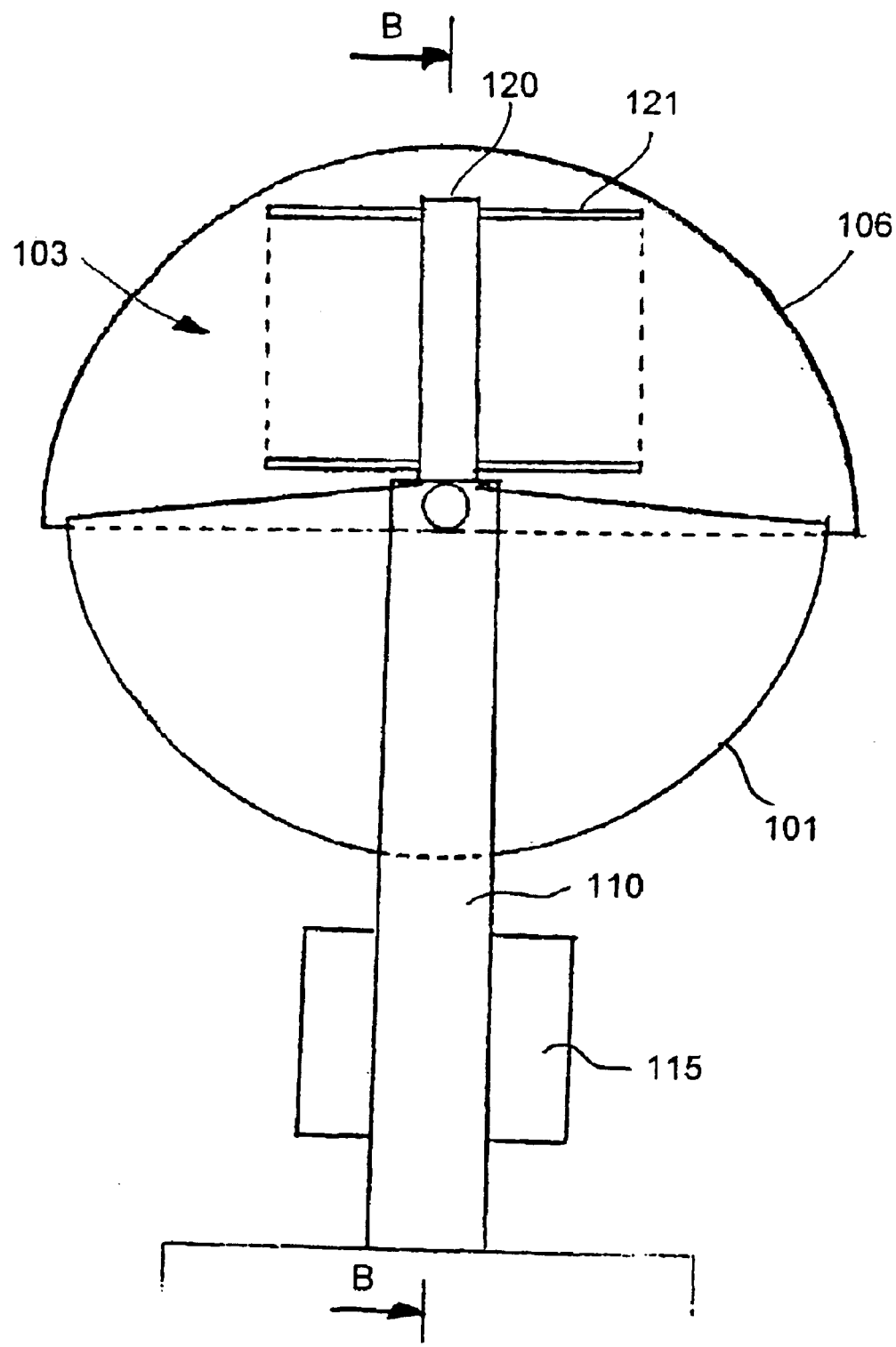
FIG. 9 shows an alternative, preferred embodiment of an apparatus according to the invention, seen from the side.

FIG. 9 shows a further embodiment wherein the apparatus comprises a housing 101 with a drive unit, a frame 110, a control unit 115, a cover 106, and a rotor element 103. The housing 101 is configured as a closed and approximately semicylindrical object cut-off in correspondence with the cylinder axis; the housing is mounted in a frame 110 such that the cylinder axis is substantially embedded horizontally. The cover 106 is also configured as approximately as a semicylinder cut-off in correspondence with its cylinder axis and open in correspondence with the cut edge. The cover is mounted on the frame 110 in such a manner that the cylinder axis of the cover essentially coincides with the cylinder axis of the housing. The cover is configured with a width that is wider (corresponding to the length of the cylinder axis) and a cylinder radius that is larger than the housing, and pivotally mounted on the frame such that the cylinder axis of the cover also constitutes its axis of rotation. This configuration of the cover and housing makes it possible for the cover, upon a 180 degree rotation about its axis of rotation, to be conveyed from its first position as shown in FIG. 9 to a second position underneath the housing, and such that the housing is essentially enclosed in the cover. In FIG. 9, the end face of the cover towards the viewer has been removed such that the rotor element 103 arranged on top of the housing is visible. When the cover is turned away as described above, the rotor element will be uncovered and a measurement can be initiated. As also described above, this device will ensure that the inside of the cover is protected against atmospheric precipitation while in its second position.

Figure 10:
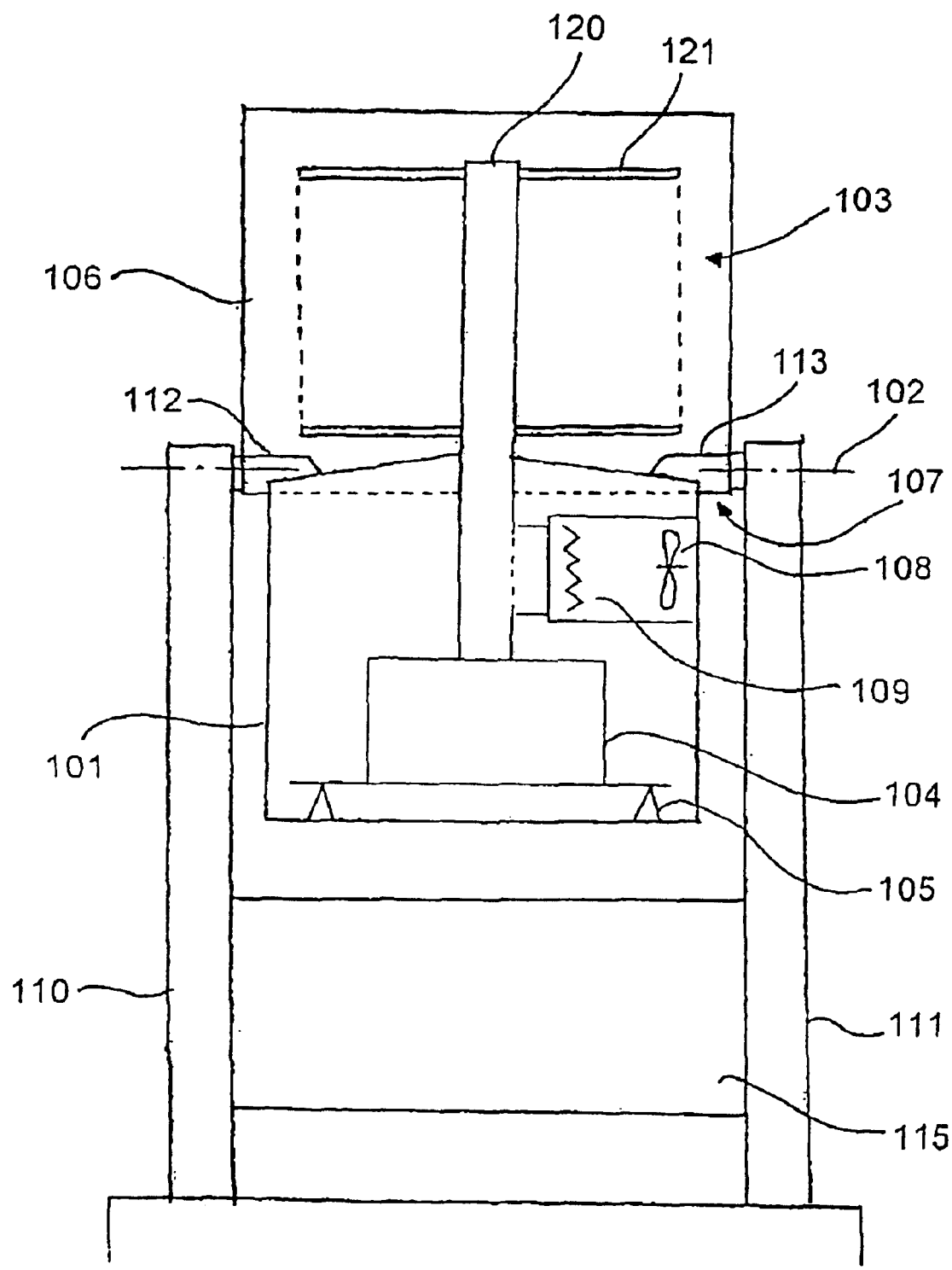
FIG. 10 is a vertical, sectional view through the apparatus shown in FIG. 9 corresponding to the plane indicated by B—B.

Study of FIG. 10 will now reveal a section through the apparatus shown in FIG. 9 corresponding to the plane indicated by B—B. As will appear, the housing is—by means of two fittings 112,113—mounted in a frame consisting of two posts 110,111. As described above, the housing as well as the cover are mounted with their respective cylinder axes about a common axis 102. The rotor element 103 comprises a rotor shaft 120 and a system of surface elements of which only the top 121 and bottom ones are shown. The overall cylindrical shape of the rotor element is outlined with dotted lines. In the space 107 between the cover and the housing, a sealing is advantageously arranged whereby it is prevented both that atmospheric precipitation penetrates into the space between the cover and the housing and that the atmospheric precipitation that has found its way to the space, if any, will be removed from the inside of the cover when it is conveyed from its second to its first position. As shown in FIGS. 9 and 10, the top face of the housing is configured as an upwardly conical face, whereby it is ensured that eg melt water is, upon heating of the surface elements, conveyed away from the housing and in particular away from the rotor shaft passage.

Between the posts a control unit 115 is arranged for controlling the drive unit 104, the weighing unit 105, the blower 108, and the heater element 109, and for collection, storage and optionally transmission of measurement data. Such units are configured for functioning in a manner similar to the one described above with reference to FIGS. 1 through 4. In FIG. 10 it is indicated that air is, by means of the blower 8, blown into the rotor s haft and from there conveyed out through the surface elements as also described above. Between the top part of the housing and the rotor shaft, a (not shown) bearing device can advantageously be arranged for supporting and guiding the shaft. According to a preferred embodiment, the apparatus further comprises (not shown) means for automatically shifting the cover between its first and second positions. Obviously, the apparatus comprises a device for securing the cover in its first position; preferably also in its second position.

A preferred embodiment of a rotor element for use in an apparatus according to the invention will now be described with reference to FIGS. 11, 12 and 13.

Figure 11:
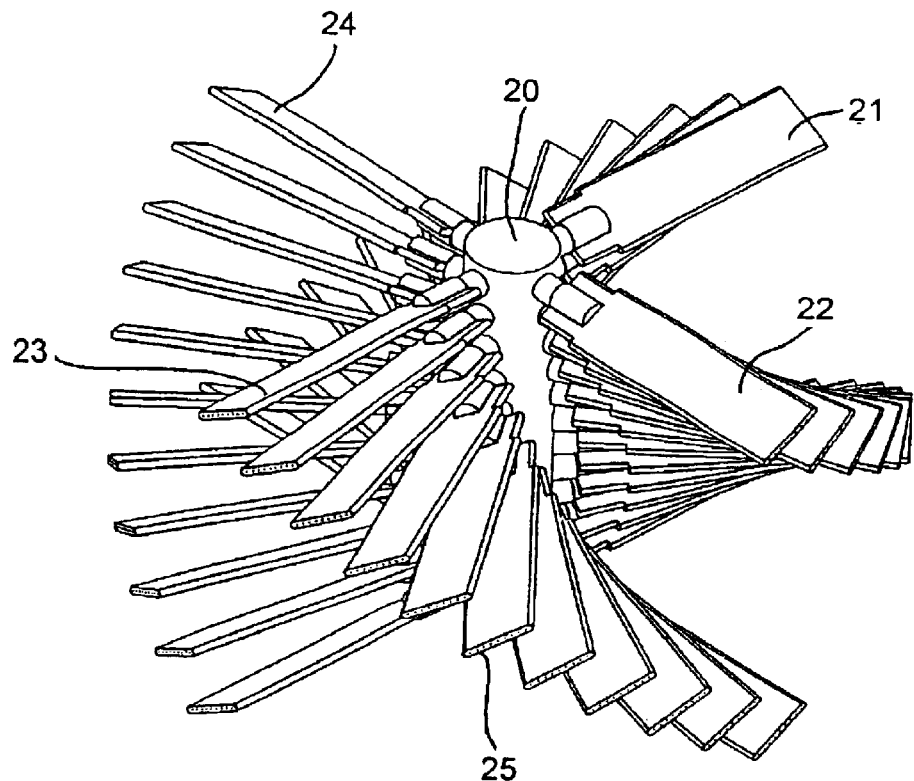
FIG. 11 illustrates a preferred embodiment of a rotor element for use in connection with the invention.

In FIG. 11, the rotor element comprises a shaft 20 on which four stacks are arranged that each consists of a number of surface elements arranged at a mutual distance opposite each other with the respective top surface elements 21,22,23,24 arranged in an uppermost plane. Each surface element has a free outer end and an inner end secured to the shaft. The uppermost face elements are arranged with a constant mutual angular distance that corresponds to an angle of 90 degrees as far as four top surface elements are concerned.

As will appear from the figure, the surface elements in the individual stack are displaced relative to each other with the outer free ends arranged so as to generally form a helix. For each stack this helix extends at least over an angle corresponding to the angle between two successively arranged stacks. For an embodiment with four stacks a helix thus extends over at least 90 degrees. In a particular case where only one stack is used, such stack will be able to extend a full rotation about the shaft, ie 360 degrees.

The individual surface elements are configured and arranged such that, in correspondence with their projection on a horizontal face, they overlap the surface element(s) that are adjacent to or arranged between, respectively, the individual surface elements, so as to eliminate spaces between the individual surface elements when the apparatus is viewed from above. This is shown in FIG. 12 that illustrates the apparatus according to FIG. 11, seen from above. Hereby it is obtained that atmospheric precipitation falling within the expanse of the apparatus hits the surface elements and is thus able to settle in the form of ice. The larger the overlap between the individual surface elements, the larger a deviation from vertically falling atmospheric precipitation can be tolerated, while ensuring this.

In correspondence with the above teachings, the surface elements in the embodiment shown can advantageously be configured and arranged such that the individual surface elements corresponding to their projection on a vertical face abut on or overlap the surface elements (5) that adjoin or surround, respectively, the individual surface element so as to eliminate a space, if any, between the individual surface elements when the apparatus is seen from the side. Hereby it is obtained that the atmospheric air conveyed across the surface elements by the relative movement between the atmospheric air and the surface elements hits a surface element and is thereby able to deposit the water contained therein as ice. This is in accordance with the disclosures above with reference to FIG. 5.

Figure 12:
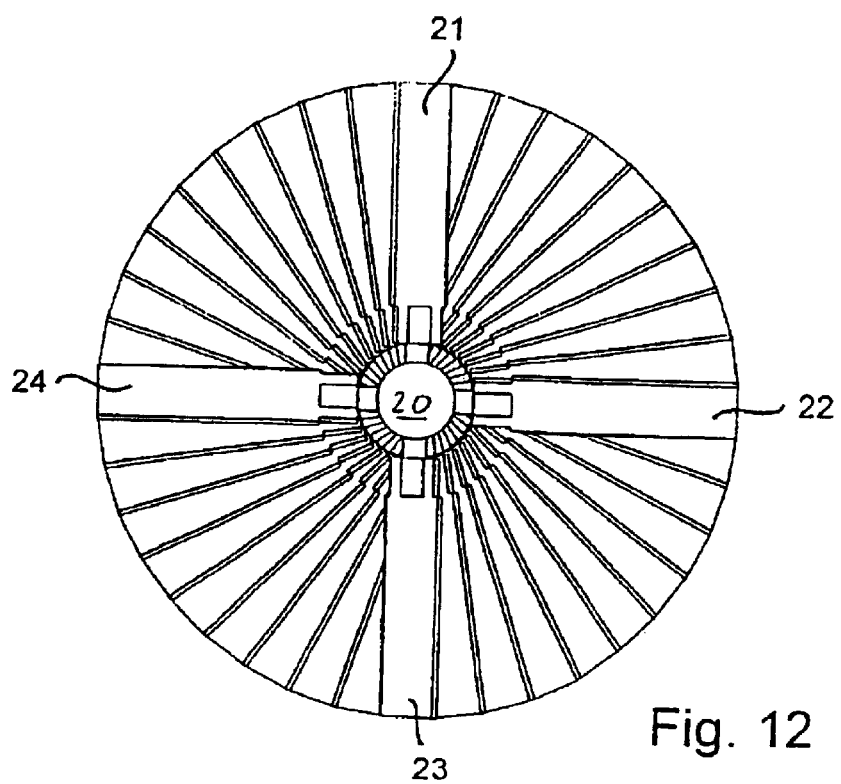
FIG. 12 is a top plan view of the rotor element corresponding FIG. 11.
Figure 13:
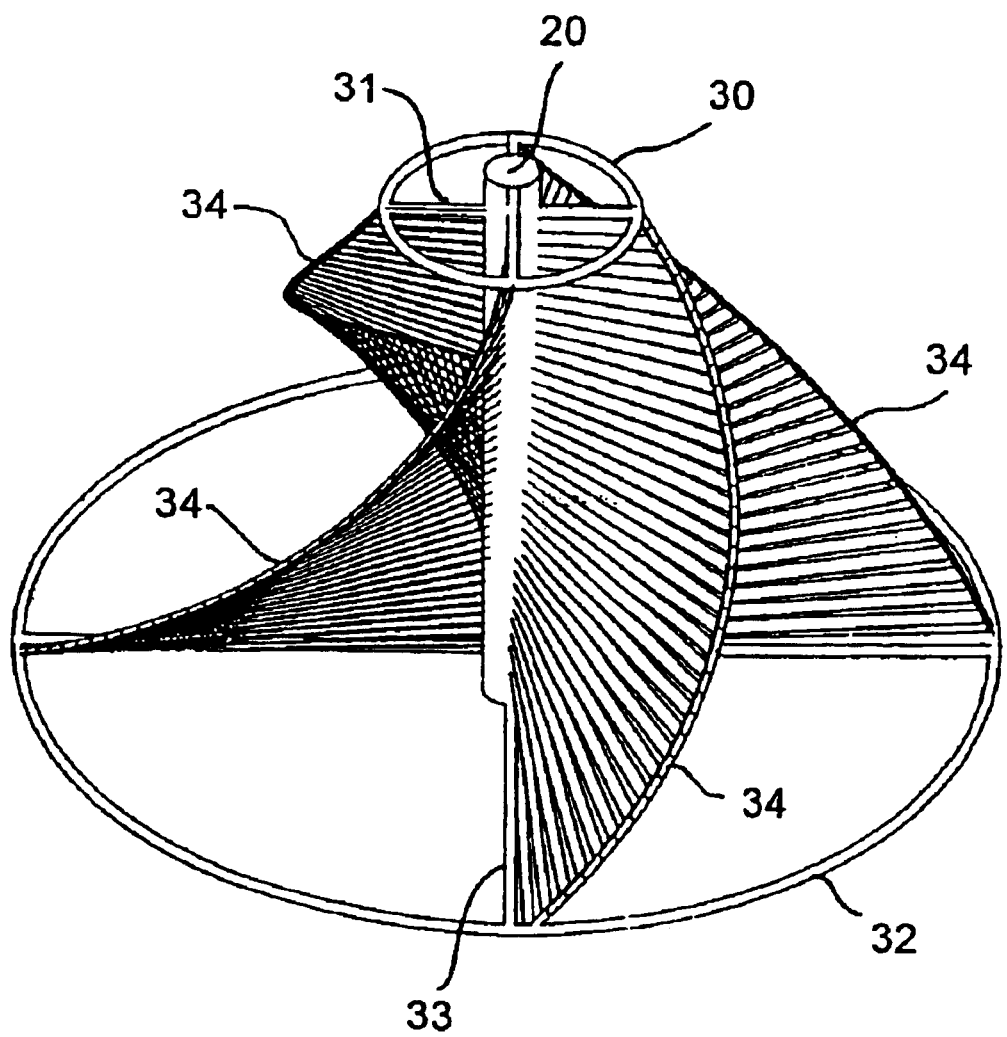
FIG. 13 shows a further preferred embodiment of a rotor element for use in connection with the invention.

In an embodiment as shown in FIGS. 11 and 12 it is further ensured that the apparatus can be configured with the smallest possible outer dimensions. For instance, an embodiment with four stacks of each eleven surface elements and a diameter of 70 cm has proven to be convenient.

As will also appear from FIG. 11, the individual surface elements are provided with a number of passageways 25 through which air can be blown, heated air to deice the surface elements and air with ambient temperature for tempering the surface elements prior to the next measurement, respectively. According to a convenient embodiment the air is conveyed from the basis of the apparatus to the surface elements through the shaft 20.

In accordance with the embodiment shown in FIG. 11, the surface elements are attached only to the shaft 20 in correspondence with their one end, and this is why the individual surface element is dimensioned to support itself and resist the forces that will occur during the intended use of the apparatus. In an alternative embodiment shown in FIG. 13, a large number of rather thin surface elements are used that will be secured partly in correspondence with their inner end to the shaft, partly secured with their outer end to a support structure. This support structure comprises an upper support element 30 secured to the shaft by means of upper connecting means 31 and a lower support member 32 secured to the shaft by means of lower connecting elements 33. Between the upper and the lower Support elements a number of outer support elements 34 are arranged, to which the outer end of the surface elements are secured. Corresponding to the above-described embodiment, four stacks of surface elements are also used herein that are in a corresponding manner supported by four outer support elements 34.

Corresponding to the embodiment shown in FIG. 11, the surface elements have equal lengths, which means that each helix extends in a manner that corresponds to the surface of a cylinder and, likewise, the overall shape of the rotor element will be cylindrical. In the alternative embodiment shown in FIG. 13, for each stack surface elements are used that have decreasing length towards the top of the apparatus; if the length decreases linearly the individual outer support element 34 will have a course corresponding to a helix on the surface of a cone, and—likewise—the overall shape of the rotor element will in that case be a cone. As stated above, the overall shape and dimensions of the rotor element and the cover will conveniently correspond to each other. For an embodiment of the apparatus like the one shown in FIGS. 6 through 8, the rotor element should thus be semispherical.

Of course, it is possible in case of both the described embodiments to arrange surface elements such that the helix-shape described is not a 'perfect' geometrical helix but merely what the person skilled in the art describes as "spiral-shaped".

Obviously, on the basis of the above explanation of the principle underlying the invention, the person skilled in the art will readily be able to point to various embodiments of the construction of an apparatus that is able to perform said process steps as well as to identify process parameters that are suitable therefor with due regard to the configuration of the apparatus, such as the period of time during which the surface elements are to be moved through the open air as shown in FIG. 2, and the rate at which the surface elements 3 are to be moved through the air in order to obtain suitable measurement results that are not considerably influenced in case atmospheric precipitation other than supercooled water and mist is deposited on the surface elements 3. Obviously, there is a correlation between the configuration of the apparatus itself and the operation parameters that ensure that the desired measurement results are obtained.

What is claimed is:

1. A method for local measurement of an icing factor for atmospheric air containing supercooled water, the method comprising the following process steps:
   providing at least one surface element that is made of a material suitable for ice in atmospheric air to freeze on, said element having a predetermined surface area;
   bringing the surface element(s) to a temperature that corresponds essentially to the temperature of the atmospheric air;
   rotating said at least one surface element through the atmospheric air at a predetermined velocity for a predetermined period of time to enable ice to freeze thereon; and
   subsequently measuring a thickness or mass of ice frozen fast to said at least one surface element by means of a measurement device configured therefore after said predetermined period of time.

2. A method according to claim 1, wherein the ice frozen fast is, following measurement of said mass or thickness thereof, removed from the at least one surface element, whereupon a renewed measurement process can be performed.

3. A method according to claim 2, wherein the ice frozen fast is removed by heating of said at least one surface element.

4. A method according to claim 1, wherein a cover is provided that in a first position extends at least across said at least one surface element, and covers and shields the at least one surface element; and said cover being removed from the at least one surface element at least for the predetermined period of time during which the at least one surface element is moved through the atmospheric air at a predetermined rate.

5. A method according to claim 4, wherein the at least one surface element is caused to move for a predetermined period of time after the cover has reverted to its first position following a measurement procedure, whereupon the thickness or mass of the ice frozen fast on the at least one surface element is measured.

6. A method according to claim 1, wherein the at least one surface element is caused to move through the atmospheric air at a velocity that ensures that atmospheric precipitation not frozen fast thereon is substantially thrown off.

7. A method according to claim 1, wherein at least two surface elements are used that are rotatably arranged on a rotor shaft; and wherein the rotor shaft is rotated to move the two surface elements through the ambient air.

8. An apparatus for local measurement of icing factor for atmospheric air containing supercooled water, wherein the apparatus comprises at least one surface element made of a material suitable for ice in atmospheric air to freeze on, wherein the at least one surface element has a predetermined surface area, and wherein the apparatus further comprises means for rotating the at least one surface element through the atmospheric air at a predetermined rate and for a predetermined period of time, and wherein further means are provided for measuring the thickness or mass of the ice frozen fast onto the at least one surface element after the predetermined period of time, during which the at least one surface element has been moved through the atmospheric air.

9. An apparatus according to claim 8, comprising a weighing device configured for weighing and recording at least the weight of the at least one surface element before and after the at least one surface element has moved through the atmospheric air.

10. An apparatus according to claim 9, comprising means for heating the at least one surface element.

11. An apparatus according to claim 10, wherein the apparatus comprises a rotor element with a rotor shaft, and at least two surface elements that extend from the rotor shaft and protrude therefrom, and wherein means are provided for rotating the rotor about an axis thereof.

12. An apparatus according to claim 11, wherein the apparatus comprises a cover whose inside faces towards the at least one surface element and which is configured for occupying a first position in which it extends across the at least one surface element that is hereby covered upwardly, and a second position in which the cover is removed.

13. An apparatus according to claim 12, wherein the cover is configured such that it forms, in said first position, a closed space around the at least one surface element.

14. An apparatus according to claim 13, wherein means are provided for heating the closed space underneath the cover.

15. An apparatus according to claim 14, wherein the apparatus moves the at least one surface element for a predetermined period of time after the cover has, following a measurement procedure, reverted to its first position, whereupon the thickness or mass of ice frozen fast can be determined.

16. An apparatus according to claim 15, wherein the cover is, in said second position, positioned such that its inside is substantially protected against atmospheric precipitation and consequently remains dry.

17. An apparatus according to claim 15, wherein the each of the at least one surface element consists of a plate having a front and a back oriented opposite thereto, and wherein the plate is configured such that the front of the plate faces in the direction in which the respective surface element is moved through the atmospheric air, and wherein—through the plate—a plurality of passageways extend from the front of the plate to back thereof such that the atmospheric air is allowed to flow through the passageways from the front of the plate to the back of the plate.

18. An apparatus according to claim 17, including a system of surface elements mounted on a rotatable shaft configured for being positioned in an essentially vertical position; and wherein the individual surface elements are configured and arranged such that the individual surface elements abut or overlap other surface elements seen in the direction of said shaft, whereby no space remains between the individual surface elements when the apparatus is viewed from above, and thus that all atmospheric precipitation falling within the expanse of the apparatus, when the rotatable shaft is positioned vertically, essentially hits the surface elements and is thus able to settle in the form of ice.

19. An apparatus according to claim 18, wherein the surface elements are configured and arranged such that the individual surface elements corresponding to their projection on a face parallel with the rotatable shaft (20) abuts on or overlaps other surface elements, whereby there is no space between the individual surface elements, when the apparatus is viewed from the side, and such that the atmospheric air conveyed across the surface elements in a direction substantially perpendicular to the shaft by a relative movement between the atmospheric air and the surface elements substantially hits a surface element and is thus able to deposit the water contained therein as ice.

20. An apparatus according to claim 19, wherein the surface elements include passageways; and the apparatus comprises means such that air can be conveyed through the passageways.

21. An apparatus according to claim 20, wherein the apparatus comprises means for providing air in the form of either heated air or air essentially at ambient temperature.

22. An apparatus according to claim 21, including means for recording the measurement results for the thickness or mass of the ice deposited on the surface element(s), and means for visually or auditively emitting a signal to monitoring personnel related to the measurement results.

23. An apparatus according to claim 22, wherein the apparatus comprises means for converting the thickness or mass measured into a value that will be indicative of a risk of icing.

* * * * *